UNITED STATES PATENT OFFICE.

CHRISTIAN SHUNK, OF ARMSTRONG COUNTY, PENNSYLVANIA.

IMPROVEMENT IN THE MANUFACTURE OF REFINED INGOTS OF IRON AND STEEL.

Specification forming part of Letters Patent No. 70,476, dated November 5, 1687.

*To all whom it may concern:*

Be it known that I, CHRISTIAN SHUNK, of Armstrong county, State of Pennsylvania, have invented and discovered a new and useful Improvement in the Manufacture of Refined Ingots of Iron and Steel from molten pig-iron by the pneumatic process, and of wrought or bar iron, melted in "pots" or crucibles, into refined steel ingots for forging purposes.

It is known to iron and steel workers that some kinds of iron and pig-iron contain impurities injurious to the iron for refining and converting purposes. To remedy this difficulty my improvement consists in the use of certain metals added to the iron in a molten state in any properly-constructed refining-fire or crucible of any desirable form of construction to contain the molten metal to be refined, and which has the effect of a detergent, and thereby dissolving and removing the impurities contained in the iron during the converting process of the metal into refined ingots of iron and steel or semi-steel.

The said ingredients consist of the following, namely: About one-eighth of one per cent. of metallic zinc, known as spelter, and the same of block-tin, in bar or the pig, and about one-sixteenth of one per cent. of metallic antimony, in the slab—the commercial name, "antimony regulus"—and like amount of bar-lead; that is, to every hundred pounds of iron or pig-iron I employ two ounces of metallic zinc, and the same quantity of block tin, and one ounce of metallic antimony and one ounce of bar-lead, and varied according to the quality of the iron used, and which any practical iron and steel worker will readily understand, and which are introduced into the molten iron in a refining-crucible, or any similar apparatus adapted to contain the iron in a molten condition; and the same proportions of said metals are employed in the refining and converting of bar or wrought-iron melted in pots or crucibles, for the manufacture of refined steel ingots, and which are added to the refining-crucible at the time the iron becomes at a molten heat.

Air-blast under pressure, forced into molten crude iron, combines freely with the carbon, and the addition of said ingredients, and which has the effect of cleansing and purifying the iron, and the consumption of the carbon, increased heat and fluidity of the iron is obtained and a perfect separation of the impurities of the metal is effected.

In the manufacture of refined ingots from crude molten pig metal by the introduction of compressed air-blast forced in, is the process of expansion of the iron in a fluid condition, and the addition of said metals before described has the effect of causing increased fluidity of the iron, and thereby the expansion of all the particles of the liquid metal is obtained, and refined ingots of improved quality is the result, and freed from the cold or red, short kind, so injurious to the iron.

Iron refined and converted by this improved mode retains its fluidity in the crucible a longer time after the blast is let off, and therefore affording more time to the workman to pour the refined metal into the molds to form the ingots before the metal becomes "chilled" in pouring, and especially where the carbon is much reduced, as in the making of low-refined semi-steel.

When the iron contains sulphur the use of common salt (chloride of sodium) as a flux in the refining-crucible or apparatus containing the metal is beneficial. Common salt as a flux was patented by me before for treating molten iron.

For the pneumatic process for refining and converting molten iron by the employment of compressed air-blast forced in as a converting agent into ingots of iron and steel, I hold Letters Patent from the United States as the first and original inventor and discoverer of that mode of converting crude iron into ingots for forging and rolling purposes.

I am aware that the use of certain metals in some forms of the iron business has been attempted before, but not with any practical results, nor for the purposes used by me in the manufacture of refined ingots of iron and steel.

What I claim as my invention or discovery, and for which I ask Letters Patent, is—

The employment and the application of certain metals, herein set forth, (or an equivalet, or either of the same separate from the other,) in the refining and converting molten crude iron into refined ingots of iron and steel or semi-steel by the pneumatic process, and of bar or wrought iron converted into refined steel ingots by the pot or crucible mode for melting the iron.

CHRISTIAN SHUNK.

Witnesses:
MAHLON STANDLEY,
WM. PORTER.